United States Patent [19]

Berens

[11] Patent Number: 4,598,114

[45] Date of Patent: Jul. 1, 1986

[54] ESSENTIALLY NEUTRAL RUST CONVERTER AND RUST PREVENTIVE

[75] Inventor: Ulrich Berens, Verl, Fed. Rep. of Germany

[73] Assignee: Ingenieurburo Leuenberger AG, Huttwil, Switzerland

[21] Appl. No.: 749,937

[22] Filed: Jun. 27, 1985

Related U.S. Application Data

[63] Continuation-in-part of Ser. No. 652,344, Sep. 19, 1984, abandoned.

[30] Foreign Application Priority Data

Jun. 29, 1984 [CH] Switzerland .......................... 3161/84

[51] Int. Cl.$^4$ .................... C08K 5/05; C09D 5/08; C09D 3/58; C09D 3/64
[52] U.S. Cl. .................. 524/345; 106/14.05; 106/14.11; 106/14.34; 523/402
[58] Field of Search ............... 106/14.11, 14.05, 14.34; 523/402; 524/345

[56] References Cited

U.S. PATENT DOCUMENTS

| | | | |
|---|---|---|---|
| 680,387 | 8/1901 | Moore | 524/345 |
| 2,026,442 | 12/1935 | Somerville | 524/345 |
| 2,068,935 | 1/1937 | Somerville | 524/345 |
| 2,249,536 | 7/1941 | McDowell et al. | 524/345 |
| 2,273,035 | 2/1942 | Hale | 524/345 |
| 2,304,466 | 12/1942 | Matheson et al. | 524/345 |
| 2,662,867 | 12/1953 | Hoertz | 524/345 |
| 3,220,968 | 11/1965 | Dollhausen et al. | 524/345 |
| 4,041,001 | 8/1977 | Szymanski et al. | 524/345 |
| 4,086,182 | 4/1978 | Hengelhaupt et al. | 106/14.13 |

FOREIGN PATENT DOCUMENTS

| | | | |
|---|---|---|---|
| 684490 | 4/1964 | Canada | 524/345 |
| 0107899 | 5/1984 | European Pat. Off. | |
| 2555597 | 6/1977 | Fed. Rep. of Germany | |
| 2254653 | 12/1977 | France | |
| 84/00973 | 3/1984 | World Int. Prop. O. | |
| 1093200 | 11/1967 | United Kingdom | 524/345 |
| 2075538 | 11/1981 | United Kingdom | 524/345 |
| 626102 | 9/1978 | U.S.S.R. | 524/345 |

*Primary Examiner*—Ronald W. Griffin
*Attorney, Agent, or Firm*—Ladas & Parry

[57] ABSTRACT

The rust converter and rust preventive contains
(a) an aqueous dispersion, emulsion or solution of at least one polymeric binder and
(b) at least one trihydroxybenzene.
(c) It has an essentially neutral reaction.

18 Claims, No Drawings

ESSENTIALLY NEUTRAL RUST CONVERTER AND RUST PREVENTIVE

This is a continuation-in-part of co-pending application Ser. No. 652,344, filed Sept. 19, 1984, now abandoned.

So-called rust converters are already known. According to Römpps Chemie-Lexikon ("Römpp's Chemical Dictionary"), 6th edition, volume III (1966), these are preparations which are applied directly to rusty areas of iron which has not been cleaned or freed from rust and convert the rust into harmless chemical compounds (in most cases phosphates) which give protection against further rusting. The rust converters are in most cases mixtures of phosphoric acid, wetting agents, fat solvents, pickling inhibitors, accelerators, salts of phosphoric acids and the like. As is known, pickling inhibitors are acids used for removing rust from metal to which inhibitors have been added in order to inhibit the action of the acid on the metal.

Without exception, the rust converters known hitherto have an acid reaction. This is a disadvantage, since excess acid can attack the iron and can damage other constituents of the rust converters, for example can render the binder coating brittle.

The invention therefore relates to an essentially neutral rust converter and rust preventive which reduces the rust to zero valent (i.e. metallic) iron and then protects the iron against further corrosion.

The rust converter according to the invention contains
(a) an aqueous dispersion, emulsion or solution of at least one polymeric binder and
(b) at least one trihydroxybenzene, and
(c) has an essentially neutral reaction.

The binder or mixture of binders is preferably a vinylchloride copolymer, a vinyl acetate homopolymer or copolymer, a phenoplast, an alkyd resin, an epoxy resin, a styrene/butadiene rubber, a styrene/butadiene/acrylonitrile rubber or, in particular, an acrylic resin or a mixture thereof. As is known, acrylic resins are to be understood as meaning thermoplastic homopolymers and copolymers of acrylic acid, methacrylic acid and esters thereof. The rust converter and rust preventive according to the invention preferably contains 20 to 45 percent by weight, in particular approx. 35 percent by weight, of binder solids. After the reduction of the rust by the component (b), the binder forms a corrosion-resistant layer. In the course of this the color changes to deep blue to black.

Suitable trihydroxybenzenes or mixtures of trihydroxybenzenes are pyrogallol (1,2,3-trihydroxybenzene) and hydroxyhydroquinone 1,2,4-trihydroxybenzene) or mixtures thereof. These compounds are powerful reducing agents which reduce the rust to metallic iron. The rust converter and rust preventive according to the invention preferably contains the component (b) in amounts of 0.5 to 10 percent by weight, in particular 2.5 to 5 percent by weight.

The rust converter and rust preventive according to the invention preferably contains a total of 25 to 65% by weight, in particular 55 to 60% by weight, of water. This is preferably replaced in part by at least one organic polar solvent, such as lower monohydric alcohols, preferably ethanol, isopropanol or butanol, lower glycols, such as propylene glycol, lower aldehydes, lower halogenated hydrocarbons, esters, such as butyl acetate or glycol acetate, or mixtures thereof. These organic polar solvents are preferably present in an amount of 2 to 25% by weight, in particular in an amount of approximately 2 to 10% by weight. If the rust converter and rust preventive is to be atomized from spray cans, it can contain up to 20 or 25% by weight of the organic polar solvent.

The rust converter and rust preventive according to the invention preferably also contains at least one thickener, such as silicic acids, magnesium silicate or hydroxyethylcellulose or mixtures thereof. Depending on the consistency of the rust converter and rust preventive, the thickener(s) can be present in amounts of 0.1 to 2% by weight, preferably 0.3% by weight if the agent is a low-viscosity preparation, and up to 3% by weight if it is a paste.

In order that the rust converter and rust preventive according to the invention shall produce a coating having a glossy, smooth surface structure, at least one organic non-polar solvent, such as petroleum fractions, toluene, xylene or ethyl acetate, in particular white spirit, can be added to it. The organic non-polar solvent is preferably present in an amount of 2 to 40% by weight, in particular approx. 4% by weight.

A dyestuff, preferably a yellow dyestuff, can also be added to the rust converter and rust preventive according to the invention, so that an optically attractive product is produced. The dyestuff can be present in an amount of 0.1 to 10% by weight, preferably 0.1 to 0.2% by weight.

The rust converter and rust preventive according to the invention can additionally contain the customary plasticizers and/or emulsifiers and/or emulsion stabilizers and/or preservatives and/or anti-foaming agents. The content of preservative is preferably 0.01 to 1% by weight, in particular approx. 0.1% by weight, and the content of anti-foaming agent is preferably 0.1 to 1% by weight, in particular approx. 0.1% by weight. If the rust converter and rust preventive is to be atomized from a spray can, it can contain more anti-foaming agent, preferably up to 5% by weight, in particular 0.5 to 0.6% by weight.

EXAMPLE 1

The following constituents are combined in the sequence indicated, with stirring. This gives a rust converter and rust preventive of pH 7.1 which is suitable for application by brushing and rolling.

| Constituents | % by weight |
| --- | --- |
| Ethanol | 2.0 |
| Water | 22.1 |
| Pyrogallol | 3.5 |
| Magnesium silicate | 0.3 |
| Binder dispersion[1] | 72.0 |
| Yellow dyestuff | 0.1 |

[1]Ercusol I 60 (registered product of Bayer AG, Leverkusen, West Germany), an aqueous acrylic resin dispersion containing 42% by weight of methacrylic acid/styrene copolymer and, as a crosslinking agent, 4% by weight of amidomethylol methyl ether

EXAMPLE 2

The following constituents are combined in the sequence indicated, with stirring. This gives a rust converter and rust preventive of pH 7.1 which is suitable for application by brushing and rolling.

| Constituents | % by weight |
|---|---|
| Isopropanol | 2.0 |
| Water | 26.8 |
| Hydroxyethyl cellulose | 0.3 |
| Hydroxyhydroquinone | 2.7 |
| Binder dispersion[(2)] | 68.0 |
| Yellow dyestuff | 0.2 |

[(2)]Heso-epoxy ester R39 (registered product of Hendrix & Sommer, Tonisvorst, West Germany), an aqueous epoxy resin dispersion containing 40% by weight of dehydrated ricinoleic acid epoxy esters and, as a dispersing agent, 3% by weight of Texaphor (registered product of Henkel KGaA, Dusseldorf-Holthausen, West Germany, a fatty acid sulfonate).

EXAMPLE 3

The following constituents are combined in the sequence indicated, with stirring. This gives a rust converter and rust preventive of pH 7.1 which is suitable for application by brushing and rolling.

| Constituents | % by weight |
|---|---|
| Isopropanol | 2.0 |
| Water | 30.3 |
| Hydroxyethyl cellulose | 0.3 |
| Hydroxyhydroquinone | 3.4 |
| Binder dispersion[(3)] | 60.0 |
| White spirit | 4.0 |

[(3)]Halwestal TH 34 (registered product of Huttenes-Albertus Chemische Werke GmbH, Dusseldorf, West Germany), an aqueous alkyd resin dispersion containing 40% by weight of medium oil wood oil alkyd resin and, as a dispersing agent, 5% by weight of Texaphor (registered product of Henkel KGaA, Dusseldorf-Holthausen, West Germany, a fatty acid sulfonate).

EXAMPLE 4

The following constituents are combined in the sequence indicated, with stirring:

| | % by weight | |
|---|---|---|
| Constituents | Range | Preferably |
| 1. Vinnapas CEF 10 | 70 to 93 | 91.5 |
| 2. Desavin | 1 to 3 | 2.0 |
| 3. Propylene glycol | 0.2 to 2 | 0.7 |
| 4. White spirit | 0.2 to 3 | 0.8 |
| 5. Ammonia | 0.1 to 0.3 | 0.2 |
| 6. Pyrogallol | 2 to 6 | 4.8 |
| (50% strength solution) | | 100.0 |

Vinnapas CEF 10 is a finely particulate plastics dispersion based on a terpolymer of ethylene, vinyl acetate and vinyl chloride (registered product of Wacker-Chemie GmbH, Munich, West Germany).

Desavin is a plasticizer (registered product of Bayer AG, Leverkusen, West Germany).

The rust converter and rust preventive of the preferred composition thus obtained has the following properties:

| Viscosity: | 10 mPa · s at 20° C. |
|---|---|
| Density: | 1.08 g/ml |
| Solids content: | 48.2% by weight |
| pH: | 7.0 |

When this agent is applied to steel sheet which has rusted in a normal manner, rust conversion begins after only a few minutes and produces a deep black coloration. If the agent is applied in a layer 6 μm thick and if this layer is then provided with a coating of synthetic resin paint 40 μm thick, this coating resists the salt spray test specified by DIN for 500 hours.

EXAMPLE 5

The following constituents are combined in the sequence indicated, with stirring:

| | % by weight | |
|---|---|---|
| Constituents | Range | Preferably |
| 1. Vinnapas CEF 10 | 20.0 to 40.0 | 31.0 |
| 2. Ercusol I 60 | 20.0 to 45.0 | 36.5 |
| 3. Desavin | 0.5 to 2.5 | 1.5 |
| 4. Nopco anti-foaming agent 8034 E | 0.1 to 0.5 | 0.1 |
| 5. Propylene glycol | 0.1 to 1.8 | 0.5 |
| 6. Natrosol 250 HHR | 0.1 to 0.2 | 0.1 |
| 7. Pyrogallol | 2.5 to 5.5 | 3.8 |
| 8. Water | 18.0 to 36.0 | 26.0 |
| 9. Dibutylamine | 0.3 to 1.5 | 0.5 |
| | | 100.0 |

Vinnapas CEF 10 is a finely particulate plastics dispersion based on a terpolymer of ethylene, vinyl acetate and vinyl chloride (registered product of Wacker-Chemie GmbH, Munich, West Germany).

Ercusol I 60 is an aqueous acrylic resin dispersion containing 42% by weight of methacrylic acid/styrene copolymer and, as a crosslinking agent, 4% by weight of amidomethylol methyl ether (registered product of Bayer AG, Leverkusen, West Germany).

Desavin is a plasticizer (registered product of Bayer AG, Leverkusen, West Germany).

Nopco anti-foaming agent 8034 E is a registered product of Nopco Chemical Division, Morristown, N.J., USA, a division of Diamond Shamrock Corp., Cleveland, Ohio, USA.

Natrosol 250 HHR is hydroxyethyl cellulose (registered product of Hercules Inc., Wilmington, Del., USA).

The dibutylamine is used to adjust the pH. The rust converter and rust preventive of the preferred composition thus obtained has the following properties:

| Viscosity as specified in DIN 53,211 (DIN cup 4) at 20° C.: | 12 DIN seconds |
|---|---|
| Density: | 1.04 g/ml |
| Solids content: | 38.3% by weight |
| pH: | 7.2 |

Rust conversion takes place within approx. 30 minutes, and the dried layer can be painted over with most commercially available top lacquer systems within 24 hours.

EXAMPLE 6

The following constituents are combined in the sequence indicated, with stirring:

| | % by weight | |
|---|---|---|
| Constituents | Range | Preferably |
| 1. Vinnapas CEF 10 | 51 to 57 | 67.0 |
| 2. Desavin | 0 to 5 | 2.0 |
| 3. Propylene glycol | 0 to 2 | 0.5 |
| 4. White spirit | 0.2 to 3 | 0.5 |
| 5. Pyrogallol paste | 15 to 40 | 30.0 |
| | | 100.0 |

Vinnapas CEF is a finely particulate plastics dispersion based on a terpolymer of ethylene, vinyl acetate and vinyl chloride (registered product of Wacker-Chemie, Munich, West Germany).

Desavin is a plasticizer (registered product of Bayer AG, Leverkusen, West Germany).

The pyrogallol paste consists of 87% by weight of water, 10% by weight of pyrogallol and 3% by weight of Bentone EW, a montmorillonite (registered product of NL Industries, Inc., New York, N.Y., USA). The Bentone EW is used to stabilize the emulsion.

Approx. 1% by weight of dibutylamine is added to the mixture thus obtained, to adjust its pH. The rust converter and rust preventive of the preferred composition thus obtained has the following properties:

| Viscosity: | 20 mPa · s at 20° C. |
|---|---|
| Density: | 1.1 g/ml |
| pH: | 6.8 |

If this agent is applied to rusted metal sheets, rust conversion also begins after a few minutes and produces a deep black coloration.

EXAMPLE 7

A rust converter and rust preventive is prepared from the following constituents:

| Constituents | % by weight | |
|---|---|---|
| | Range | Preferably |
| 1. Pliolite | 21 to 41 | 28.0 |
| 2. Petroleum fraction (boiling point 35-70° C.) | 22 to 52 | 31.0 |
| 3. Texaphor | 1.5 to 4.6 | 3.0 |
| 4. Bentone EW | 0.2 to 2.4 | 0.8 |
| 5. Pyrogallol | 1.8 to 5.5 | 3.2 |
| 6. Water | 21 to 53 | 34.0 |
| | | 100.0 |

Pliolite is a styrene/butadiene copolymer (registered product of Goodyear Tyre & Rubber Company, Akron, Ohio, USA).

Texaphor is a fatty acid sulfonate used as an emulsifier (registered product of Henkel KGaA, Düsseldorf-Holthausen, West Germany).

Bentone EW is a montmorillonite (registered product of NL Industries, Inc., New York, N.Y., USA) and is used to stabilize the emulsion.

The agent of the preferred composition thus obtained has a pH of 7.0.

Rust conversion takes place within approx. 30 minutes, and the dried layer can then be painted over with most commercially available top lacquer systems within 24 hours.

EXAMPLE 8

A rust converter and rust preventive is prepared from the following constituents:

| Constituents | % by weight | |
|---|---|---|
| | Range | Preferably |
| 1. Mowilith DM 5 | 44 to 76 | 64.0 |
| 2. Bentone EW | 0.2 to 1.6 | 1.2 |
| 3. Nopco anti-foaming agent 8034 E | 0.1 to 0.3 | 0.1 |
| 4. Pyrogallol | 1.0 to 4.8 | 2.4 |
| 5. Propylene glycol | 0.1 to 1.8 | 0.4 |

-continued

| Constituents | % by weight | |
|---|---|---|
| | Range | Preferably |
| 6. Water | 18 to 45 | 31.9 |
| | | 100.0 |

Mowilith DM5 is a polyvinyl acetate dispersion containing emulsifiers incorporated in its structure (registered product of Hoechst AG, Frankfurt-Höchst, West Germany).

Bentone EW is a montmorillonite (registered product of NL Industries, Inc., New York, N.Y., USA) and is used to stabilize the emulsion.

Nopco anti-foaming agent 8034 E is a registered product of Nopco Chemical Division, Morristown, N.J., USA, a division of Diamond Shamrock Corp., Cleveland, Ohio, USA.

The pH of the agent of the preferred composition thus obtained is adjusted to a value of 6.8 by means of approximately 0.4% by weight of aqueous ammonia.

The rust conversion properties and capacity for being painted over are the same as those of the agents according to Examples 4 to 7.

EXAMPLE 9

The following constituents are combined in the sequence indicated, with stirring:

| Constituents | % by weight | |
|---|---|---|
| | Range | Preferably |
| 1. Laroflex MP 25 | 12 to 31 | 23.0 |
| 2. Butyl acetate | 6 to 11 | 9.0 |
| 3. Petroleum fraction (boiling point 35-70° C.) | 2 to 9 | 6.0 |
| 4. Xylene | 2 to 9 | 6.0 |
| 5. Butanol | 2 to 9 | 6.0 |
| 6. Emulphor EL | 1.5 to 7.0 | 3.0 |
| 7. Desavin | 0.5 to 3.5 | 1.2 |
| 8. Water | 38 to 65 | 43.0 |
| 9. Pyrogallol | 1.0 to 4.9 | 2.8 |
| | | 100.0 |

Laroflex MP 25 is a vinyl chloride copolymer (registered product of BASF AG, Ludwigshafen/Rhein, West Germany).

Emulphor EL is an emulsifier (registered product of BASF AG, Ludwigshafen/Rhein, West Germany).

Desavin is a plasticizer (registered product of Bayer AG, Leverkusen, West Germany).

The rust converter and rust preventive of the preferred composition thus obtained has a pH of 7.0.

The rust conversion properties and the capacity for being painted over are the same as those in Examples 4 to 7.

EXAMPLE 10

The following constituents are combined in the sequence indicated, with stirring:

| Constituents | % by weight | |
|---|---|---|
| | Range | Preferably |
| 1. Plexigum P 26 | 7 to 26 | 14.0 |
| 2. Petroleum fraction (boiling point 35-70° C.) | 12 to 33 | 28.0 |
| 3. Glycol acetate | 5 to 16 | 12.0 |
| 4. Desavin | 0.5 to 3.2 | 1.8 |
| 5. Pyrogallol | 1.2 to 5.6 | 3.3 |

-continued

| Constituents | % by weight | |
|---|---|---|
| | Range | Preferably |
| 6. Vitachlor 350 | 1.2 to 4.8 | 3.4 |
| 7. Water | 24 to 52 | 37.5 |
| | | 100.0 |

Plexigum P 26 is a methacrylate resin (registered product of Röhm GmbH, Darmstadt, West Germany).

Desavin is a plasticizer (registered product of Bayer AG, Leverkusen, West Germany).

Vitachlor 350 is a chloroparaffin used as an emulsifier (registered product of Dynamit Nobel AG, Troisdorf, West Germany).

The rust converter and rust preventive of the preferred composition thus obtained has a pH of 7.0.

The rust conversion properties and the capacity for being painted over are the same as those in Examples 4 to 7.

If the content of thickener (magnesium silicate or hydroxyethyl cellulose or a mixture thereof) is raised to 3% by weight, a paste is obtained.

For spraying, the products can be diluted with up to 10% by weight of water.

If the products are to be atomized from a spray can, they can be formulated as follows:

| | % by weight |
|---|---|
| Above products | 50 |
| Anti-foaming agent (for example butylglycol) | 5 |
| Ethanol | 15 |
| Propellant gas (for example propane/butane or Frigen) | 30 |

I claim:

1. A rust converter and rust preventive which contains
    (a) an aqueous dispersion, emulsion or solution of at least one polymeric binder and
    (b) at least one trihydroxybenzene, and which
    (c) has an essentially neutral reaction.

2. An agent as claimed in claim 1, wherein the binder or mixture of binders is a vinylchloride copolymer, a vinylacetate homopolymer or copolymer, a phenoplast, an alkyd resin, an epoxy resin, a styrene/butadiene rubber, a styrene/butadiene/acrylonitrile rubber or an acrylic resin or a mixture thereof.

3. An agent as claimed in claim 2, wherein the binder is an acrylic resin.

4. An agent as claimed in claim 1, wherein the trihydroxybenzene or mixture of trihydroxybenzenes is hydroxyhydroquinone or pyrogallol or a mixture thereof.

5. An agent as in claim 4 wherein the trihydroxy bezene is pyrogallol.

6. An agent as claimed in claim 1, which further comprises at least one organic polar solvent.

7. An agent as claimed in claim 6 wherein the organic polar solvent is a lower monohydric alcohol, a lower glycol, a lower aldehyde, a lower halogenated hydrocarbon, an ester or a mixture thereof.

8. An agent as claimed in claim 7 wherein the organic polar solvent is ethanol, isopropanol, butanol, propylene glycol, butyl acetate, glycol acetate or a mixture thereof.

9. An agent as claimed in claim 1, which further comprises at least one thickener.

10. An agent as claimed in claim 9 wherein the thickener is a silicic acid, magnesium silicate, hydroxyethyl cellulose or a mixture thereof.

11. An agent as claimed in claim 1, which further comprises at least one organic non-polar solvent.

12. An agent as claimed in claim 11 wherein the organic non-polar solvent is a petroleum fraction, toluene, xylene ethyl acetate, or a mixture thereof.

13. An agent as claimed in claim 12 wherein the organic non-polar solvent is white spirit.

14. An agent as claimed in claim 1, which further comprises a dyestuff.

15. An agent as claimed in claim 14 wherein the dyestuff is a yellow dyestuff.

16. An agent as claimed in claim 1, which further comprises an additive selected from the group consisting of plasticizers, emulsifiers, emulsion stabilizers, preservatives, antifoaming agents, or mixtures thereof.

17. An agent as claimed in claim 1, which is in the form of a low-viscosity preparation for spraying, a viscous preparation for application by brushing and rolling, a paste or an aerosol in combination with a propellant.

18. An agent as claimed in claim 1, which has a pH of 6.8 to 7.3.

* * * * *